(12) United States Patent
Mangum et al.

(10) Patent No.: US 10,538,262 B2
(45) Date of Patent: Jan. 21, 2020

(54) SNOW BIKE AND A FRONT SUSPENSION FOR A SNOW BIKE

(71) Applicant: Polaris Industries Inc., Medina, MN (US)

(72) Inventors: Allen M. Mangum, Sandpoint, ID (US); Cody L. Telford, Sandpoint, ID (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 15/975,048

(22) Filed: May 9, 2018

(65) Prior Publication Data

US 2018/0257690 A1  Sep. 13, 2018

Related U.S. Application Data

(63) Continuation of application No. 15/441,368, filed on Feb. 24, 2017, now Pat. No. 9,988,067.

(51) Int. Cl.
  *B62K 13/00* (2006.01)
  *B62K 21/00* (2006.01)
  *B62B 17/04* (2006.01)

(52) U.S. Cl.
  CPC .................................... *B62B 17/04* (2013.01)

(58) Field of Classification Search
  CPC .... B62K 13/00; B62K 2700/50; B62K 21/00; B62M 2027/021; B62M 2027/22; B62M 2027/26
  See application file for complete search history.

(56) References Cited

U.S. PATENT DOCUMENTS

| | | | |
|---|---|---|---|
| 3,336,994 | A | 8/1967 | Pederson |
| 3,527,505 | A | 9/1970 | Hetteen |
| 3,545,821 | A | 12/1970 | Erickson |
| 3,630,301 | A | 12/1971 | Henricks |
| 3,705,749 | A | 12/1972 | Harvey |

(Continued)

FOREIGN PATENT DOCUMENTS

| | | |
|---|---|---|
| AT | 242150 T | 6/2003 |
| CA | 2321860 A1 | 9/1999 |

(Continued)

OTHER PUBLICATIONS

Technical Preview, SnowTech, Crazy Mountain Xtreme Bike Kit, Sep. 2015; 3 pages.

(Continued)

*Primary Examiner* — Bryan A Evans
(74) *Attorney, Agent, or Firm* — Faegre Baker Daniels LLP (57) ABSTRACT

A front fork assembly of a snow bike is disclosed having left and right legs, each having an upper leg portion and a lower leg portion. The left leg upper and lower leg portions are linearly movable relative to each other. A right leg has an upper leg portion and a lower leg portion, the right leg upper and lower leg portions are linearly movable relative to each other. A ski mount has a lower end for coupling to a ski and an upper end for coupling to the left and right leg. A linear force element is coupled to the left and right legs with a first end adjacent the first ends of the forks and seconds ends coupled to the ski, the linear force element has a different linear force characteristic than the left and right legs.

24 Claims, 13 Drawing Sheets

(56) References Cited

U.S. PATENT DOCUMENTS

| | | | |
|---|---|---|---|
| 3,718,341 A | 2/1973 | Westberg |
| 3,719,369 A | 3/1973 | Savage |
| 3,779,326 A | 12/1973 | Trautwein |
| 3,809,172 A | 5/1974 | Hendrickson |
| 3,822,755 A | 7/1974 | Hine |
| 3,844,367 A | 10/1974 | Flohr |
| 3,857,578 A | 12/1974 | Alton |
| RE28,423 E | 5/1975 | Higginbotham |
| 3,964,561 A | 6/1976 | Lunzer |
| 3,977,485 A | 8/1976 | West |
| 3,982,597 A | 9/1976 | Callaway |
| 4,034,820 A | 7/1977 | Barnhardt |
| 4,131,292 A | 12/1978 | Swech |
| 4,244,436 A | 1/1981 | Condon |
| 4,424,979 A | 1/1984 | Takagi |
| 4,434,867 A | 3/1984 | Grinde |
| 4,437,534 A | 3/1984 | Grinde |
| 4,442,913 A | 4/1984 | Grinde |
| 4,449,602 A | 5/1984 | Dittmann, Jr. |
| 4,502,560 A | 3/1985 | Hisatomi |
| 4,509,766 A | 4/1985 | Yasui |
| 4,526,249 A | 7/1985 | Parker |
| 4,613,006 A * | 9/1986 | Moss | B62K 13/00 180/184 |
| 4,768,794 A * | 9/1988 | Bibollet | B62K 21/00 180/190 |
| 4,804,198 A | 2/1989 | Imai |
| 5,064,208 A | 11/1991 | Bibollet |
| 5,203,424 A | 4/1993 | Gogo |
| 5,370,198 A | 12/1994 | Karpik |
| 5,474,146 A * | 12/1995 | Yoshioka | B62K 13/00 180/184 |
| 5,586,614 A | 12/1996 | Kouchi |
| 5,727,643 A | 3/1998 | Kawano |
| 5,904,217 A | 5/1999 | Yamamoto |
| 6,012,728 A | 1/2000 | Noble |
| 6,017,047 A | 1/2000 | Hoose |
| 6,095,275 A | 8/2000 | Shaw |
| 6,105,979 A | 8/2000 | Desrochers |
| 6,112,840 A | 9/2000 | Forbes |
| 6,234,263 B1 | 5/2001 | Boivin |
| 6,283,254 B1 | 9/2001 | Bibollet |
| 6,302,232 B1 | 10/2001 | Forbes |
| 6,321,864 B1 | 11/2001 | Forbes |
| 6,382,338 B1 | 5/2002 | Forbes |
| 6,416,062 B1 | 7/2002 | Scatchard |
| 6,431,301 B1 | 8/2002 | Forbes |
| 6,505,896 B1 | 1/2003 | Boivin |
| 6,511,079 B1 | 1/2003 | Charles, Sr. |
| 6,626,258 B1 | 9/2003 | Forbes |
| 6,626,441 B1 | 9/2003 | Hanson |
| 6,631,912 B2 | 10/2003 | Metheny |
| 6,663,117 B2 | 12/2003 | Cheney |
| 6,783,133 B1 * | 8/2004 | Araujo | B62B 19/04 280/7.14 |
| 6,863,142 B2 | 3/2005 | Corbeil |
| 6,926,108 B1 | 8/2005 | Polakowski |
| 7,017,695 B2 | 3/2006 | Meunier |
| 7,090,229 B2 | 8/2006 | Monsrud |
| 7,182,165 B1 | 2/2007 | Keinath |
| 7,232,130 B2 | 6/2007 | Reeves |
| 7,322,581 B2 | 1/2008 | Leung |
| 7,353,898 B1 | 4/2008 | Bates, Jr. |
| 7,357,201 B2 | 4/2008 | Jordan |
| 7,475,751 B2 | 1/2009 | Pard |
| 7,481,437 B2 | 1/2009 | Musselman |
| 7,533,749 B1 | 5/2009 | Sampson |
| 7,537,221 B2 * | 5/2009 | Lasala | B62B 13/04 280/11.12 |
| 7,540,506 B2 | 6/2009 | Cheney |
| 7,594,557 B2 | 9/2009 | Polakowski |
| D612,766 S | 3/2010 | Boivin |
| 7,694,768 B2 | 4/2010 | Giese |
| 7,726,667 B2 | 6/2010 | Ferron |
| 7,745,751 B2 | 6/2010 | Takahashi |
| 7,789,183 B2 | 9/2010 | Sadakuni |
| 7,896,362 B1 | 3/2011 | Scatchard |
| 8,167,073 B2 | 5/2012 | Polakowski |
| 8,403,342 B1 | 3/2013 | McDaniel |
| 8,418,792 B2 | 4/2013 | Rivard |
| 8,739,913 B2 | 6/2014 | Rivard |
| 8,910,738 B2 | 12/2014 | Mangum |
| 9,751,552 B2 | 9/2017 | Mangum |
| 9,776,654 B2 | 10/2017 | Gentry |
| 9,873,485 B2 | 1/2018 | Mangum |
| 9,988,067 B1 | 6/2018 | Mangum |
| 10,202,169 B2 | 2/2019 | Mangum |
| 10,232,910 B2 | 3/2019 | Mangum |
| 2002/0041080 A1 | 4/2002 | Moriyama |
| 2003/0024751 A1 | 2/2003 | Lebreux |
| 2003/0159868 A1 * | 8/2003 | Alexander | B62M 27/02 180/190 |
| 2004/0089193 A1 | 5/2004 | O'Donnell |
| 2004/0124596 A1 | 7/2004 | Cheney |
| 2004/0163857 A1 | 8/2004 | Corbeil |
| 2004/0195024 A1 | 10/2004 | Takahiko |
| 2005/0017465 A1 | 1/2005 | Bergstrom |
| 2006/0232028 A1 | 10/2006 | Pard |
| 2008/0017465 A1 | 1/2008 | Sadakuni |
| 2008/0029324 A1 | 2/2008 | Plankenhorn |
| 2009/0230641 A1 | 9/2009 | Eugenio |
| 2009/0321167 A1 | 12/2009 | Simmons |
| 2011/0253468 A1 | 10/2011 | Rivard |
| 2011/0266077 A1 | 11/2011 | Nadeau |
| 2012/0205173 A1 | 8/2012 | Mallette |
| 2012/0222908 A1 | 9/2012 | Mangum |
| 2012/0247852 A1 | 10/2012 | Fecteau |
| 2013/0221628 A1 | 8/2013 | Rivard |
| 2013/0313794 A1 | 11/2013 | Bach |
| 2014/0035255 A1 | 2/2014 | Erickson |
| 2015/0144412 A1 | 5/2015 | Mangum |
| 2015/0251727 A1 | 9/2015 | Thibault |
| 2015/0259032 A1 | 9/2015 | Mangum |
| 2016/0031471 A1 * | 2/2016 | Anderson | B62B 17/04 280/27 |
| 2016/0167722 A1 | 6/2016 | Anderson |
| 2016/0280331 A1 | 9/2016 | Mangum |
| 2017/0066502 A1 | 3/2017 | Will |
| 2017/0129570 A1 | 5/2017 | Mangum |
| 2017/0259877 A1 | 9/2017 | Thompson |
| 2018/0251168 A1 | 9/2018 | Mangum |
| 2018/0257690 A1 | 9/2018 | Mangum |
| 2018/0273142 A1 | 9/2018 | Mangum |
| 2019/0084643 A1 | 3/2019 | Thompson |

FOREIGN PATENT DOCUMENTS

| | | |
|---|---|---|
| CA | 2555039 | 9/1999 |
| CA | 2555108 | 9/1999 |
| CA | 2561337 | 9/1999 |
| CA | 2345490 A1 | 10/2001 |
| CA | 2885569 A1 | 9/2015 |
| CA | 2887975 A1 | 9/2016 |
| CA | 2996760 A1 | 9/2018 |
| CA | 2998616 A1 | 9/2018 |
| DE | 69908558 | 4/2004 |
| DE | 69922609 | 12/2005 |
| DE | 202006017459 U1 | 6/2007 |
| EP | 0391282 A2 | 10/1990 |
| EP | 1056639 | 12/2000 |
| EP | 0994016 B1 | 12/2004 |
| JP | 61-222877 A | 10/1986 |
| JP | 2001-153168 A | 6/2001 |
| WO | 99/43540 | 9/1999 |
| WO | 2017/079503 | 5/2017 |

OTHER PUBLICATIONS

SnoWest Snowmobile Forum, View Single Post-380 mountain mini, Jan. 11, 2017, available at http://snowest.com/forum/showpost.php?p=4009975&postcount=61; 4 pages.

(56) References Cited

OTHER PUBLICATIONS

Office Action issued by the Canadian Intellectual Property Office, dated Dec. 14, 2018, for Canadian Patent Application No. 2,996,760; 3 pages.
International Search Report and Written Opinion of the International Searching Anthority, dated Apr. 18, 2017, for related International Patent Application No. PCT/US2016/060441; 24 pages.
International Preliminary Report on Patentability issued by European Patent Office, dated Jan. 26, 2018, for International Patent Application No. PCT/US2016/060441; 27 pages.
Examination Search Report issued by the Canadian Patent Office, dated Dec. 13, 2018, for Canadian Patent Application No. 2,998,616; 3 pages.

* cited by examiner

Fig. 12

SNOW BIKE AND A FRONT SUSPENSION FOR A SNOW BIKE

RELATED CASES

The present application claims priority from U.S. patent application Ser. No. 15/441,368 filed Feb. 24, 2017, the subject matter of which is incorporated herein by reference.

BACKGROUND

The present disclosure relates to a snow bike and in particular to a front suspension for a snow bike.

Snow bikes are known in the snowmobile art. These vehicles are usually converted for winter use by converting a dirt bike into a snow bike, by replacing the front tire with a ski and the rear wheel with a rear suspension and track. Such snow bikes are known from our US patents and patent applications, namely: U.S. Pat. No. 8,910,738; Publications 2012/0222908; 2015/0144412; 2015/0259032; 2016/0280331 and application Ser. Nos. 14/935,224; 14/935,265 and 15/165,862; the subject matter of which are incorporated herein by reference.

SUMMARY

In one embodiment of the invention, a front fork assembly of a snow bike comprises a left leg having an upper leg portion and a lower leg portion, the left leg upper and lower leg portions being linearly movable relative to each other; a right leg having an upper leg portion and a lower leg portion, the right leg upper and lower leg portions being linearly movable relative to each other; a ski mount having a lower end for coupling to a ski and an upper end for coupling to the left and right leg; and a linear force element coupled to the left and right legs with a first end adjacent the first ends of the forks and seconds ends coupled to the ski, the linear force element having different linear force characteristic than the left and right legs.

In another embodiment, a front fork assembly of a snow bike comprises a left leg having an upper leg portion and a lower leg portion, the left leg upper and lower leg portions being linearly movable relative to each other; a right leg having an upper leg portion and a lower leg portion, the right leg upper and lower leg portions being linearly movable relative to each other; a ski mount having a lower end for coupling to a ski and an upper end for coupling to the left and right leg; and a linear force element coupled to the left and right legs with a first end adjacent the first ends of the forks and seconds ends coupled to the ski, wherein the linear force element is an air shock.

In yet another embodiment, a snow bike comprises a frame; a powertrain supported by the frame; a rear suspension; a drive supported by the rear suspension and coupled to the drivetrain and a front suspension. The front suspension comprises a left leg having an upper leg portion and a lower leg portion, the left leg upper and lower leg portions being linearly movable relative to each other; a right leg having an upper leg portion and a lower leg portion, the right leg upper and lower leg portions being linearly movable relative to each other; a ski mount having a lower end for coupling to a ski and an upper end for coupling to the left and right leg; a linear force element coupled to the left and right legs with a first end adjacent the first ends of the forks and seconds ends coupled to the ski, the linear force element having different linear force characteristic than the left and right legs; and a front ski coupled to the front suspension.

BRIEF DESCRIPTION OF THE DRAWINGS

The embodiments will now be described by way of reference to the drawing figures, where.

DETAILED DESCRIPTION

Figure 1:
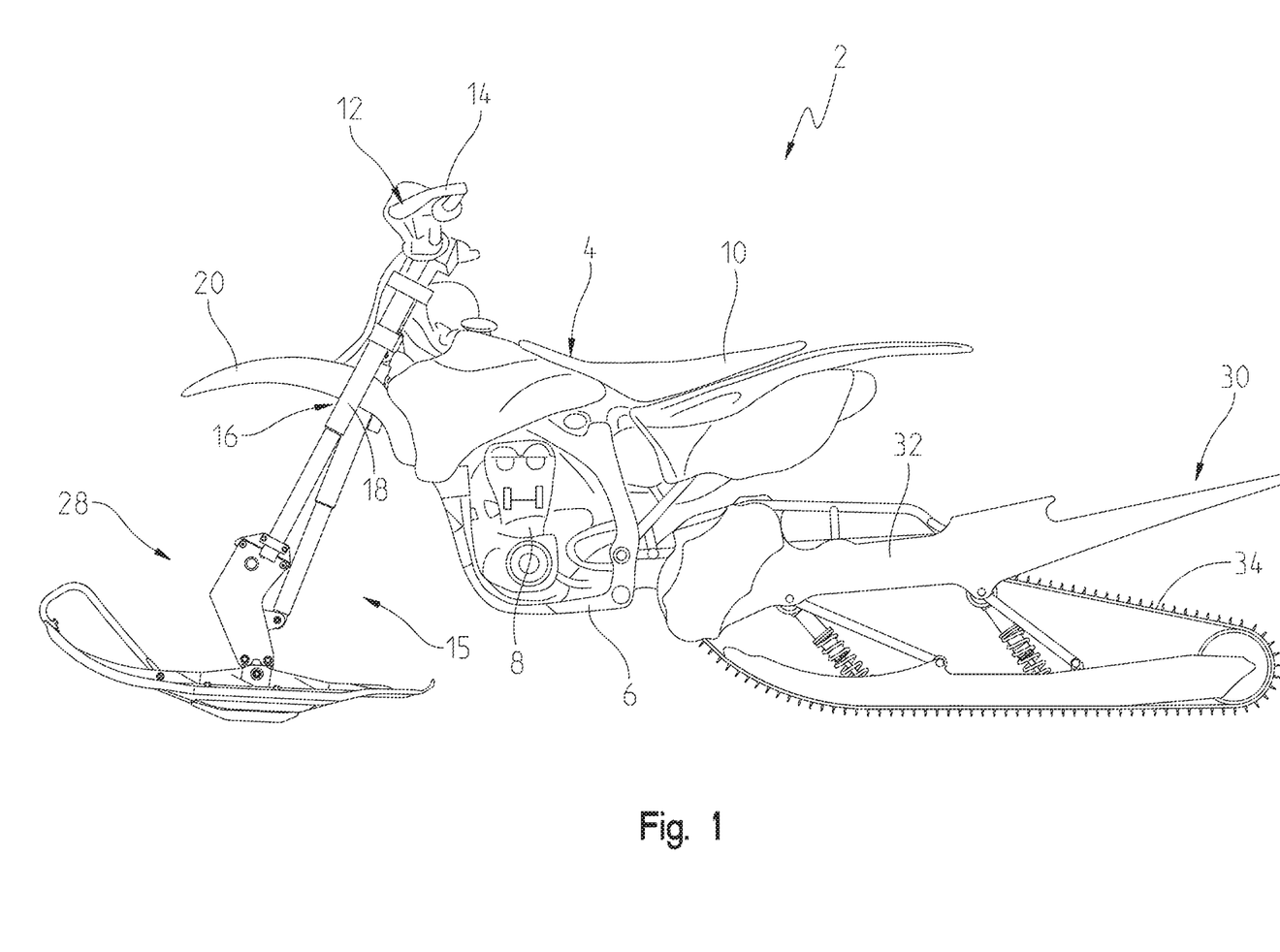
FIG. 1 is a left side view of the snow bike and front suspension of the present disclosure.

With reference first to FIG. 1, a snow bike is shown generally at 2. Snow bike 2 includes a dirt bike 4 having the front and rear wheels removed. Snow bike 2 includes a frame 6, a powertrain 8, a seat 10, steering assembly 12 including handlebars 14, and a front suspension 15. Front suspension is in part defined by the existing front fork assembly having forks 18, designated as left front fork 18L and right front fork 18R. A front fender 20 is positioned between the front forks 18. As shown, front wheel is removed and replaced with a front ski mount 28 which couple to the forks 18 as discussed herein. The rear wheel is removed and includes a rear suspension 30, including a tunnel 32 and a track 34. Rear suspension 30 could be similar to any of the rear suspensions shown in our US patents and applications, namely: U.S. Pat. No. 8,910,738; Publications 2012/0222908; 2015/0144412; 2015/0259032; 2016/0280331 and application Ser. Nos. 14/935,224; 14/935,265 and 15/165,862; the subject matter of which are incorporated herein by reference.

Figure 2:
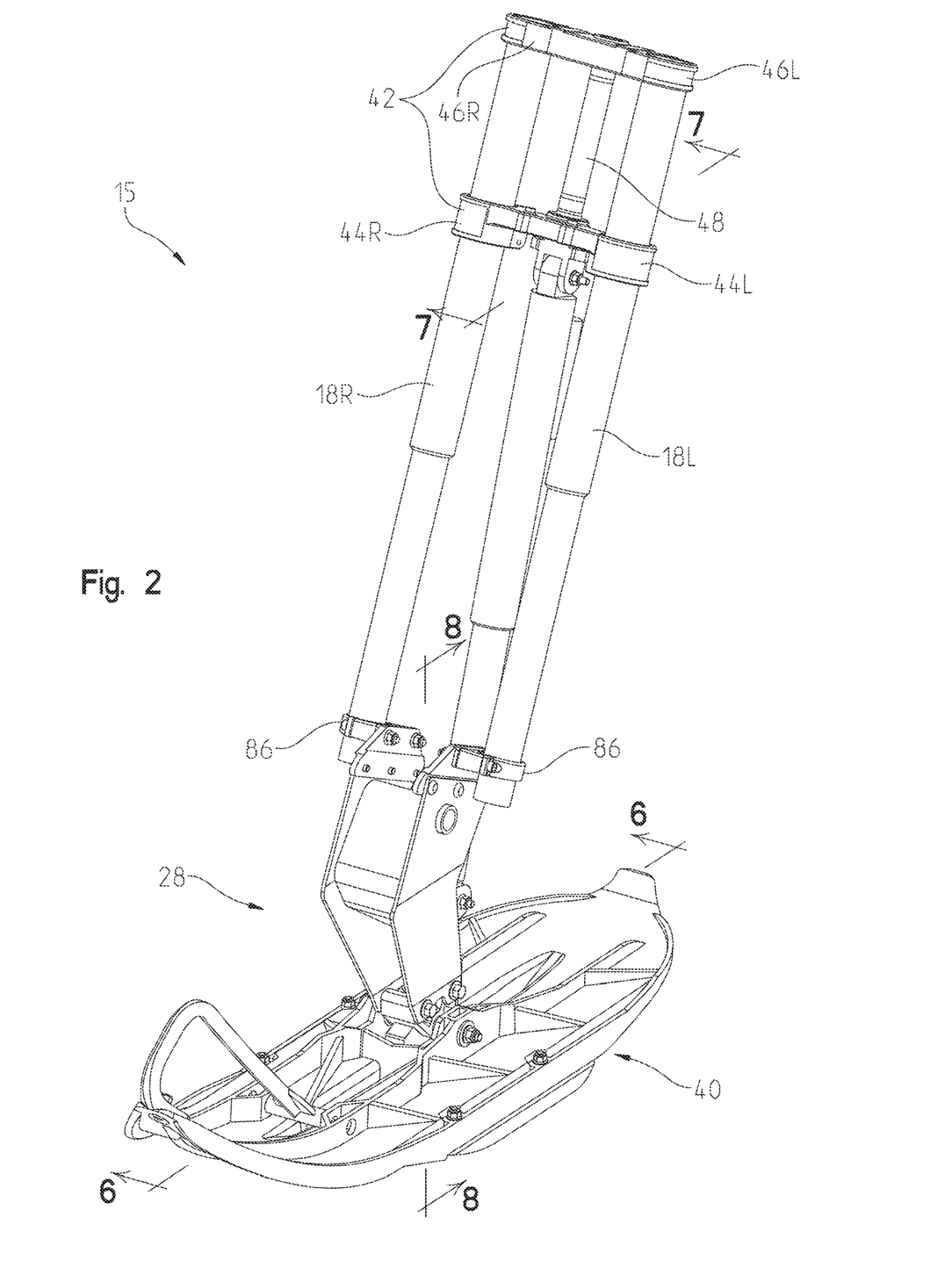
FIG. 2 is a front left perspective view of the front suspension shown in FIG. 1.
Figure 3:
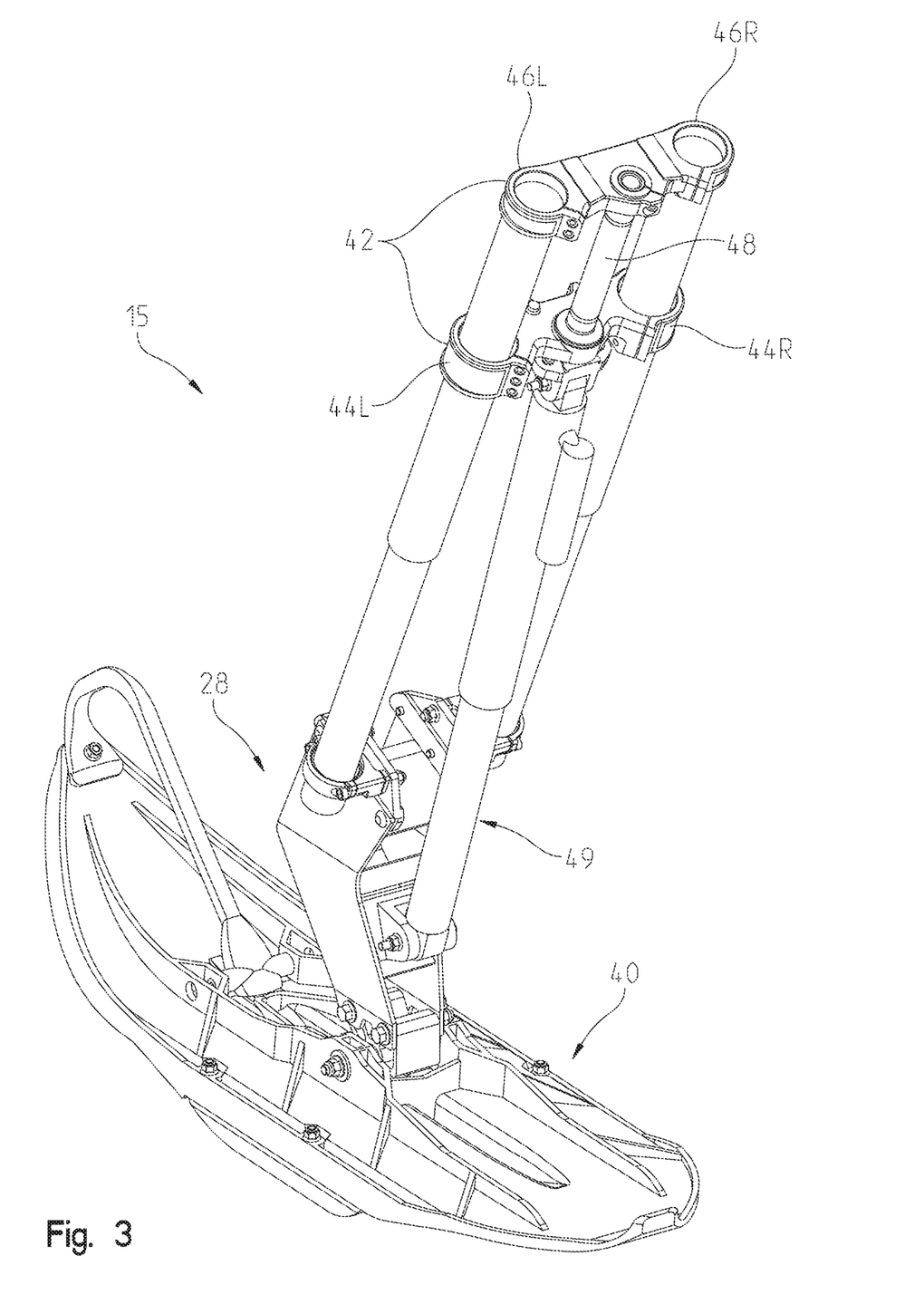
FIG. 3 is a left rear view of the front suspension shown in FIG. 2.
Figure 4:
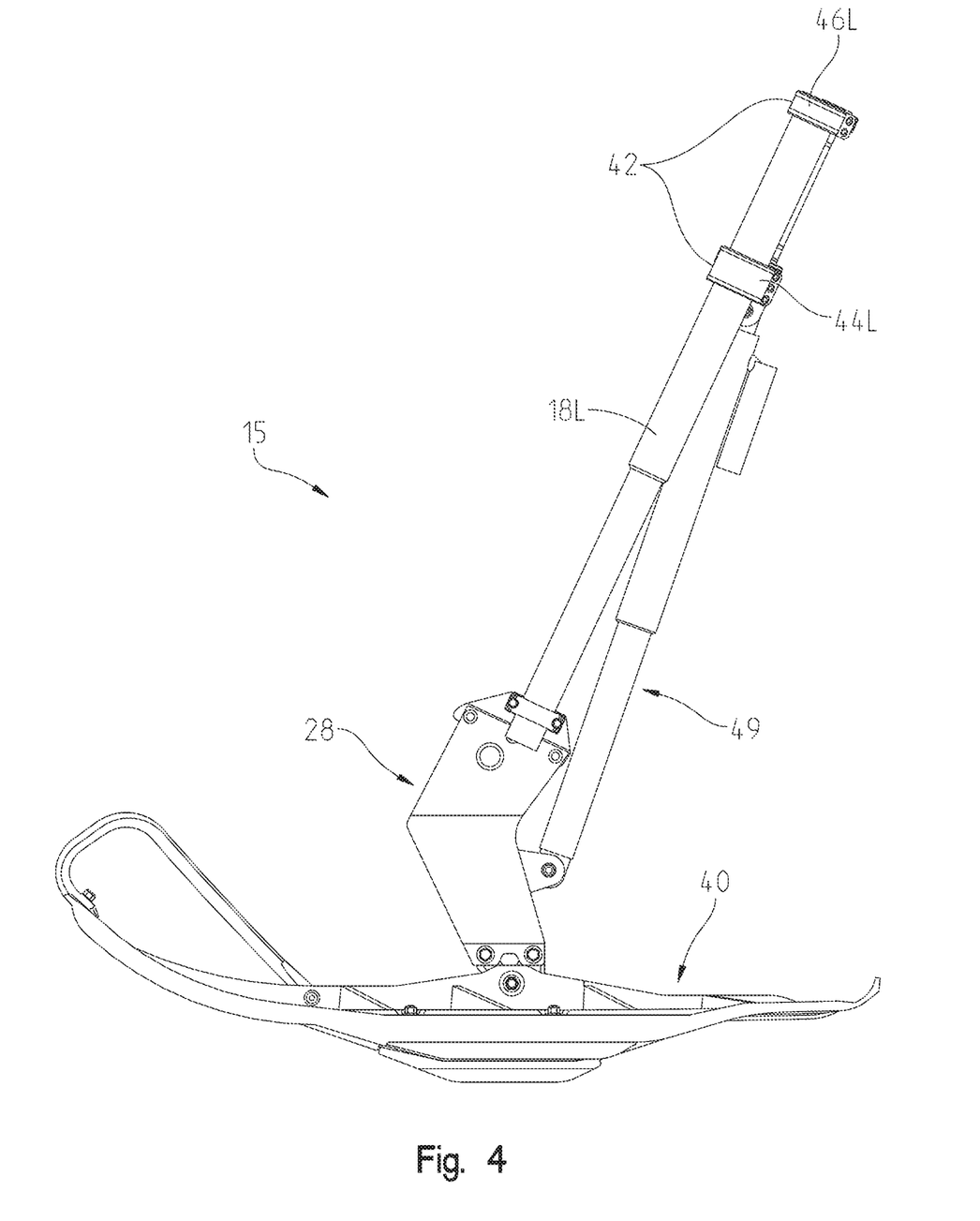
FIG. 4 is a left side view of the suspension of FIG. 2.

With reference now to FIGS. 2-4, front suspension 15 is shown comprising the forks or legs 18L and 18R which are coupled to ski mount 28, which in turn is coupled to front ski 40. It should be understood that left leg 18L and right leg 18R are coupled to the frame 6 of the snow bike by way of a triple clamp 42 having a lower left clamp portion 44L and a lower right hand clamp portion 44R; and an upper left clamp portion 46L and an upper right clamp portion 46R. These clamp portions clamp to associated legs 18L and 18R as is known in the art. Triple clamp 42 also includes a center pin 48 which may couple to a down tube (not shown) of the frame 6, such that legs 18L and 18R may rotate about pin 48 for steering. As shown in FIGS. 2-4, lower ends of the legs 18L and 18R are coupled to the ski mount 28 in order to turn the ski 40 for purposes of steering. As also shown, front suspension 15 further includes a linear force element 49 which is coupled between a bottom of triple clamp 42 and a top of the ski mount 28, as further described herein.

With reference now to FIGS. 5-8, the ski mount 28 will be described in greater detail. With reference first to FIG. 5A, ski mount 28 includes a spindle 50 having spaced apart plate portions 52. The plate portions 52 are spaced apart by way of a box-shaped inner plate 54 and a pin 56. A bracket 60 has a base portion 62 coupled between plates 52 and includes a clevis 64 having apertures at 66. Upper ends of plates 52 include apertures at 70 and lower ends of plate 52 include apertures 72.

Figure 5:
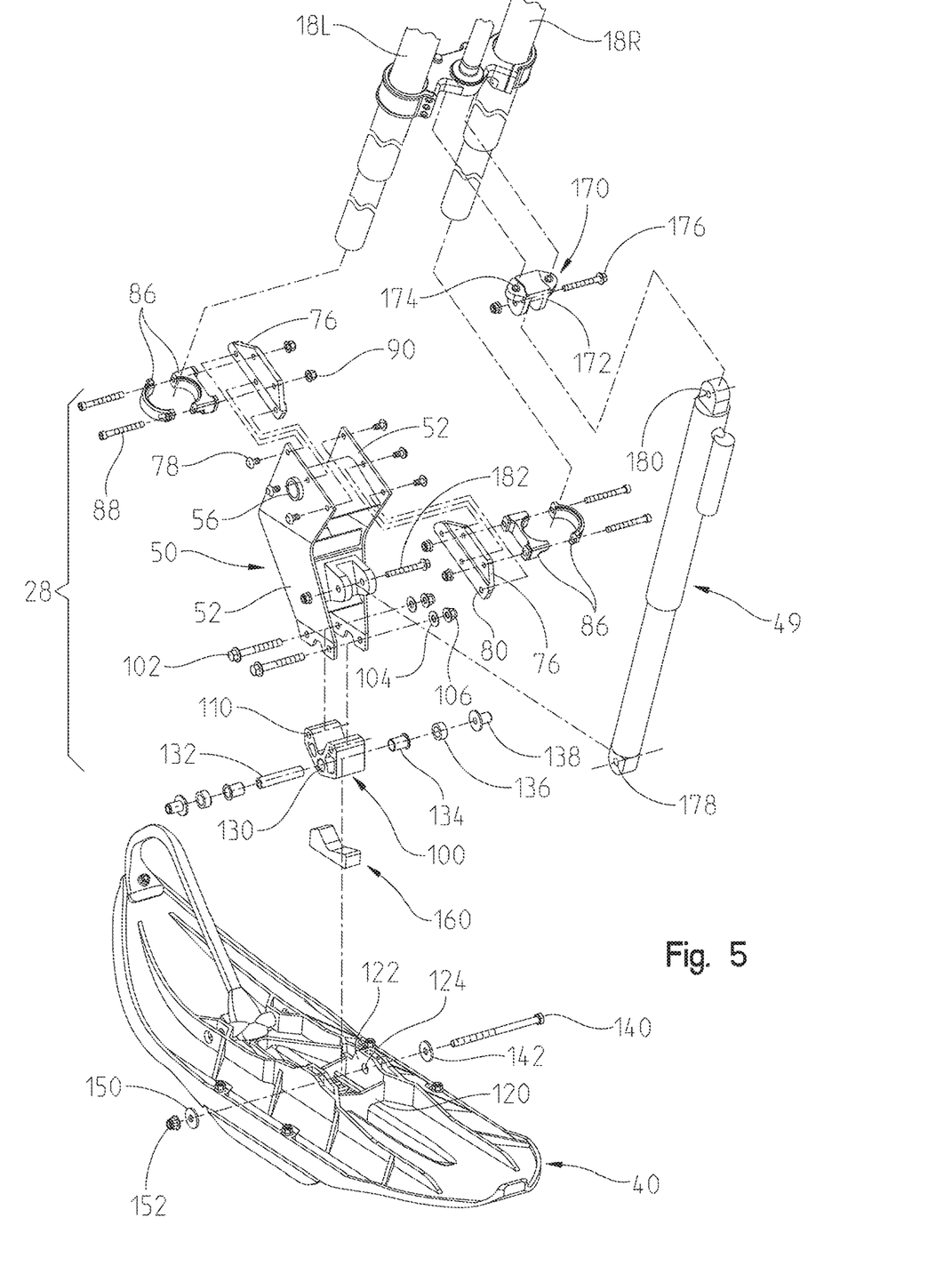
FIG. 5 is a perspective view similar to that of FIG. 3 showing the suspension in an exploded manner.
Figure 5A:
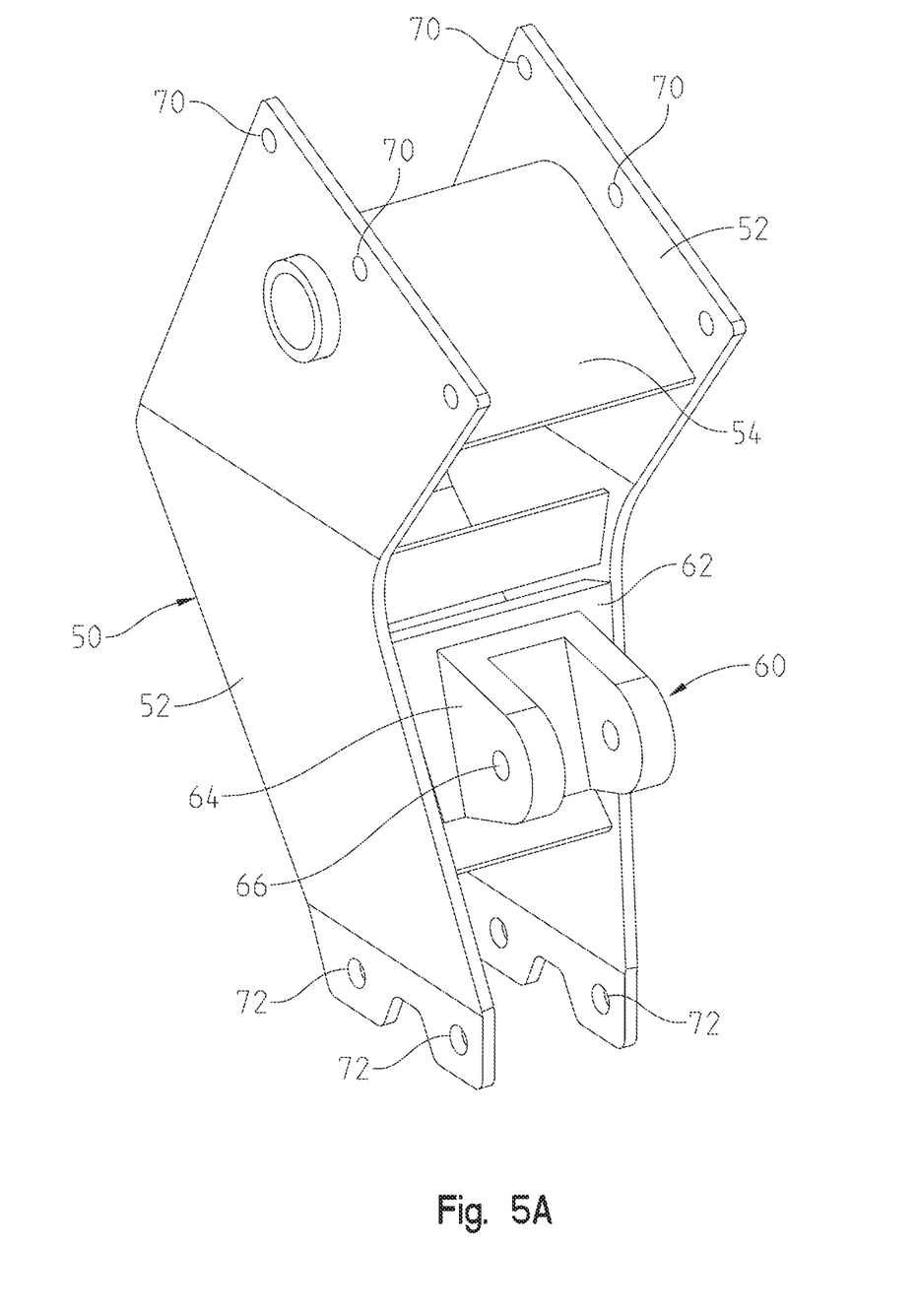
FIG. 5A is an enlarged view of the spindle portion of the ski mount shown in FIG. 5.

As shown in FIG. 5, brackets 76 are coupled to a top of the plates 52 by way of fasteners 78 extending through apertures 80 of bracket 76 and into threaded engagement with threaded apertures 70 (FIG. 5A). Brackets 76 retain clamps 86 by way of fasteners 88 and 90 which couple to ends of legs 18L and 18R as best shown in FIG. 2. Brackets 76 could be integrated with plate portions 52 which would extend from an upper edge of the plate portions 52.

Figure 6:
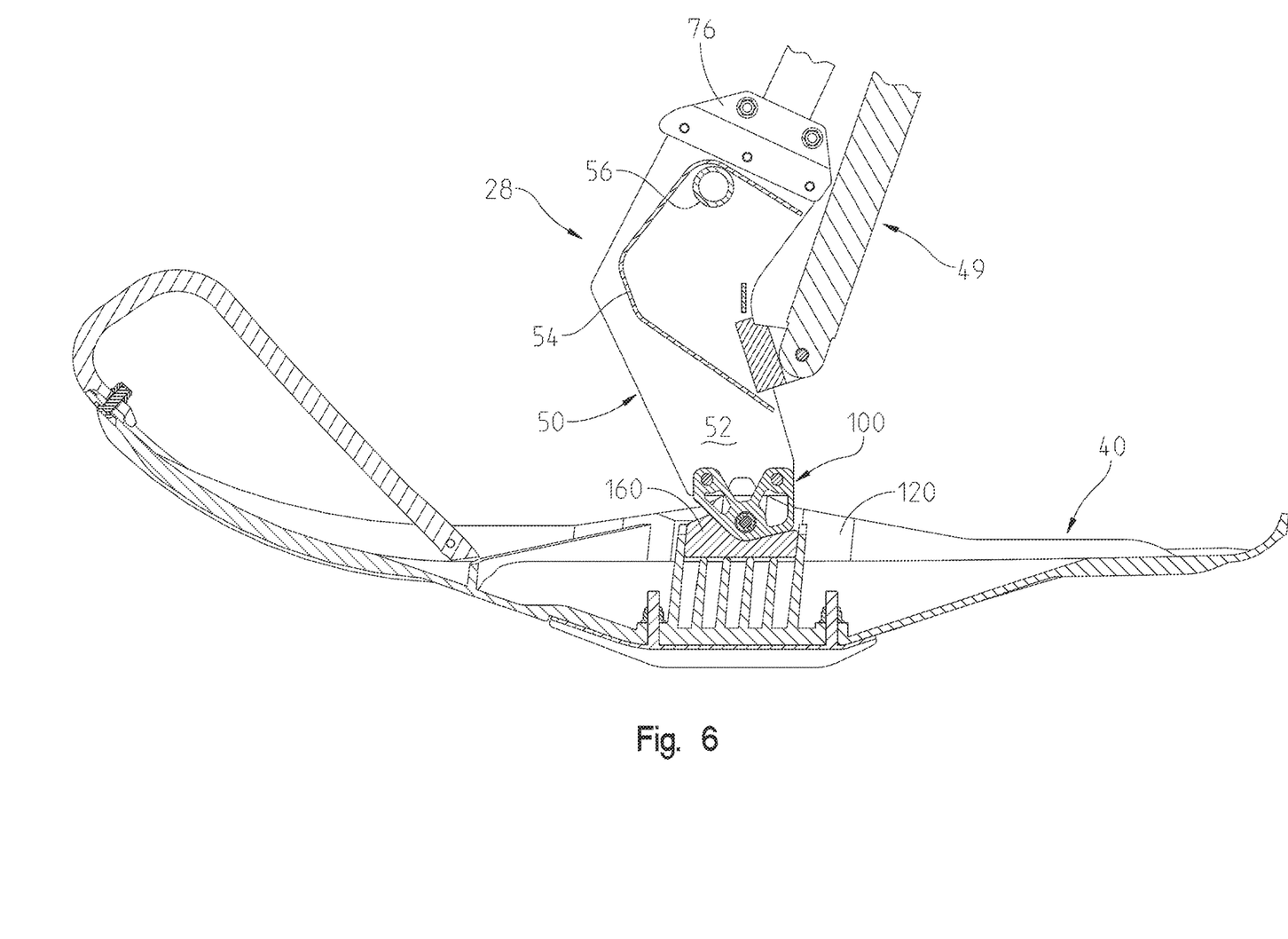
FIG. 6 is a cross-sectional view taken through lines 6-6 of FIG. 2.
Figure 7:
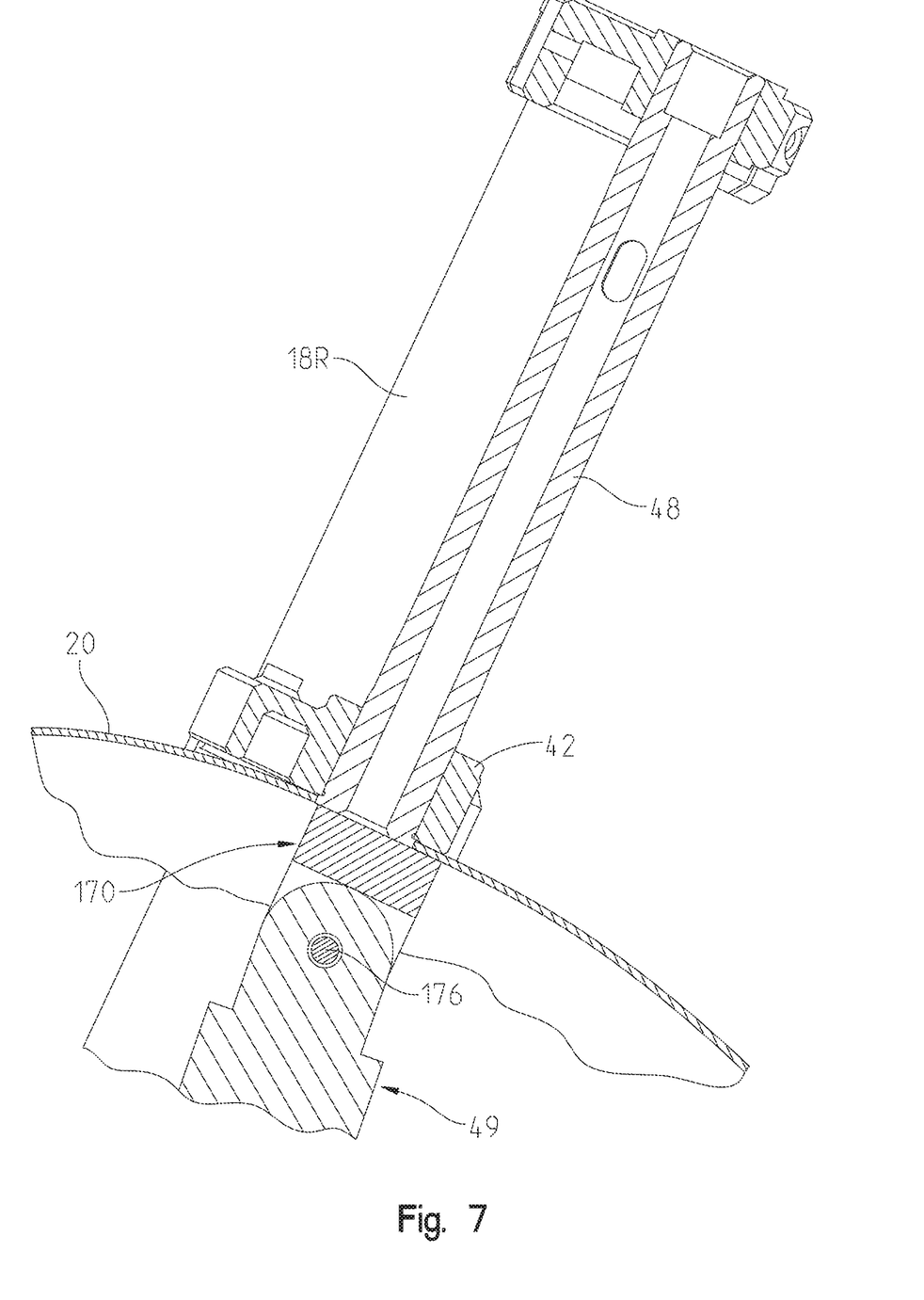
FIG. 7 is a cross-sectional view taken through lines 7-7 of FIG. 2.
Figure 8:
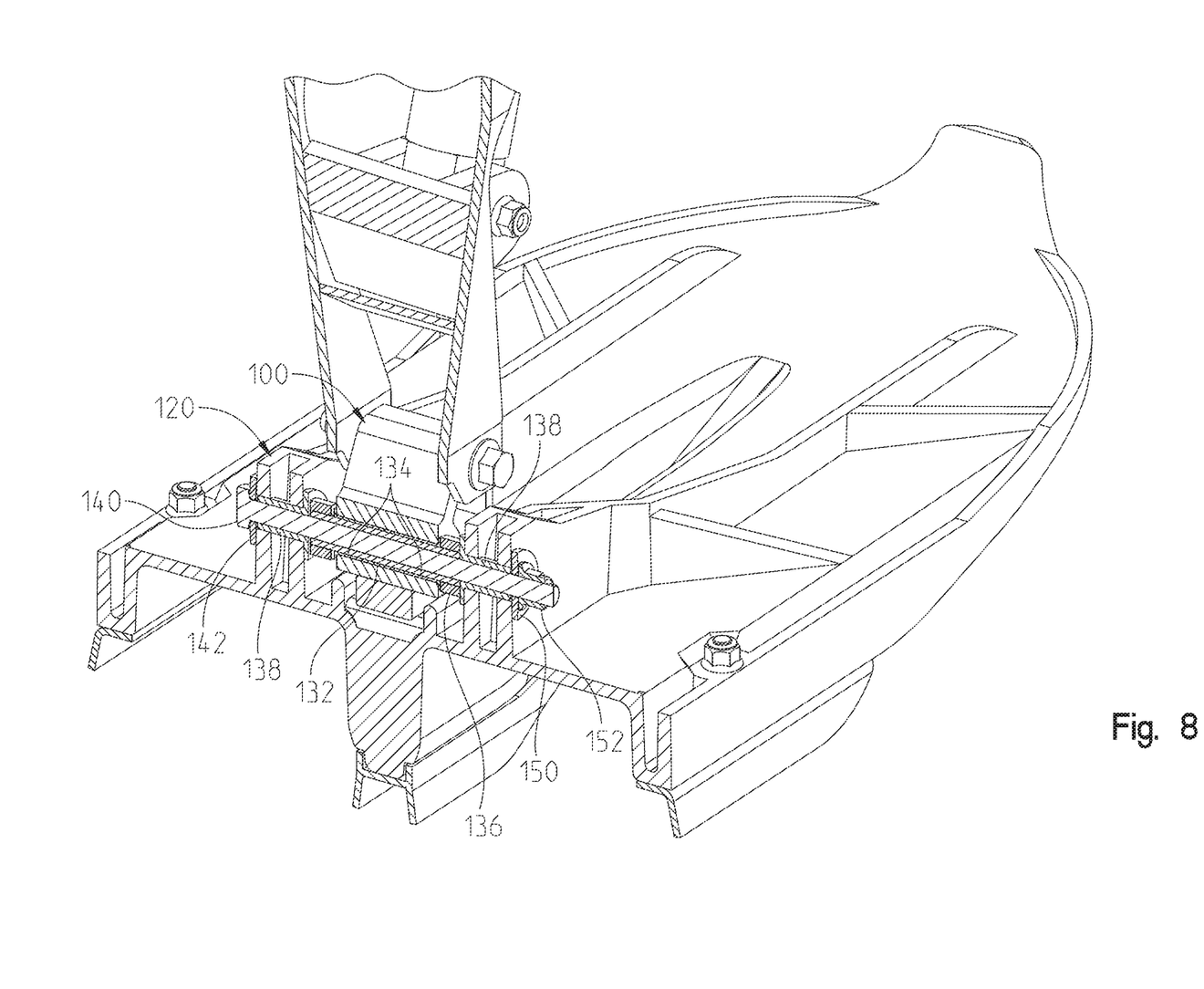
FIG. 8 is a cross-sectional view taken through lines 8-8 of FIG. 2.

A lower coupler 100 is coupled to apertures 72 (FIG. 5A) by way of fasteners 102, 104 and 106. Fasteners 102 extend through apertures 110 of coupler 100. Coupler 100 is also coupled to ski 40 and in particular, to a mount portion 120 of ski 40 where ski mount 120 includes up standing walls 122 having apertures 124. Coupler 100 includes an aperture at 130 which receives a sleeve 132 which thereupon receives bushings 134, thereover. As shown best in FIG. 8, bushings 134 overlap sleeve 132 and sleeves 138 extend into aperture 124 (FIG. 5 of ski mount 120). Spacers 136 extend between heads of the bushings 134, 138. Fastener 140 is received through washer 142 through aperture 124 and through a combination of bushings 138, 136, 134 and sleeve 130 to receive fasteners 150 and 152. Fasteners 140, 150 and 152 couple the ski 40 to the coupler 100. A rubber mount 160 is positioned in the ski mount 120 and conforms to, but allows movement between, coupler 100 and ski 40 as best shown in FIG. 6.

Finally, as shown in FIG. 5, suspension 15 includes bracket 170 having a clevis 172. Bracket 170 is mounted to a bottom of the triple clamp 42 through apertures 174. As shown best in FIG. 7, bracket 170 traps fender 20 between triple clamp 42 and bracket 170. Thus, as shown in FIG. 5, linear force element 49 is coupled to the snow bike 2 by way of fastener 176 extending through aperture 180 of linear force element 49 and through clevis 172; and by way of fastener 182 extending through aperture 178 of linear force element 49 and through clevis 64 (FIG. 5A). Thus, linear force element 49 supplements the existing shocks in the front legs 18L and 18R.

Figure 9:
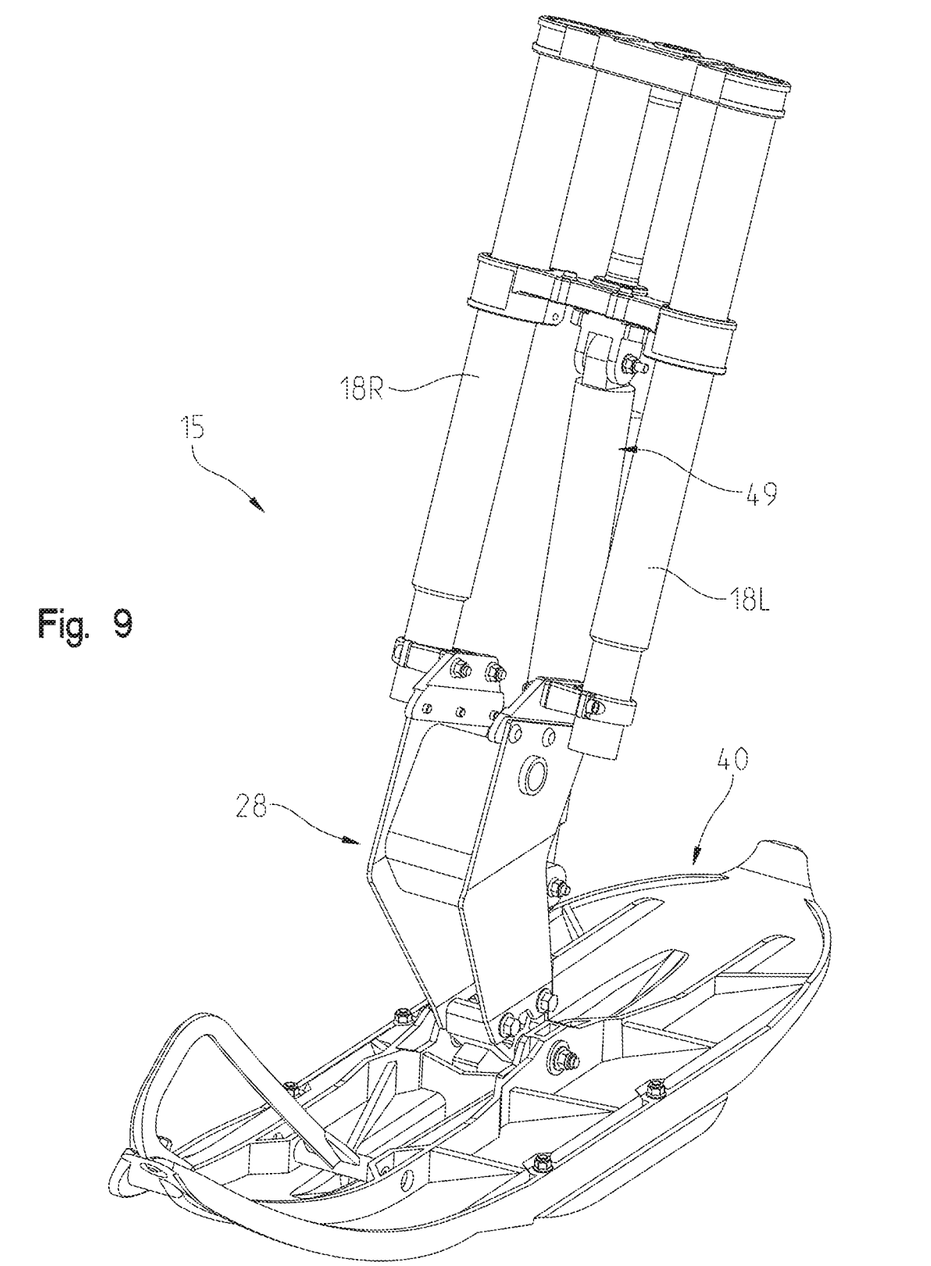
FIG. 9 is a view similar to that of FIG. 2 showing the suspension in a fully compressed configuration.
Figure 10:
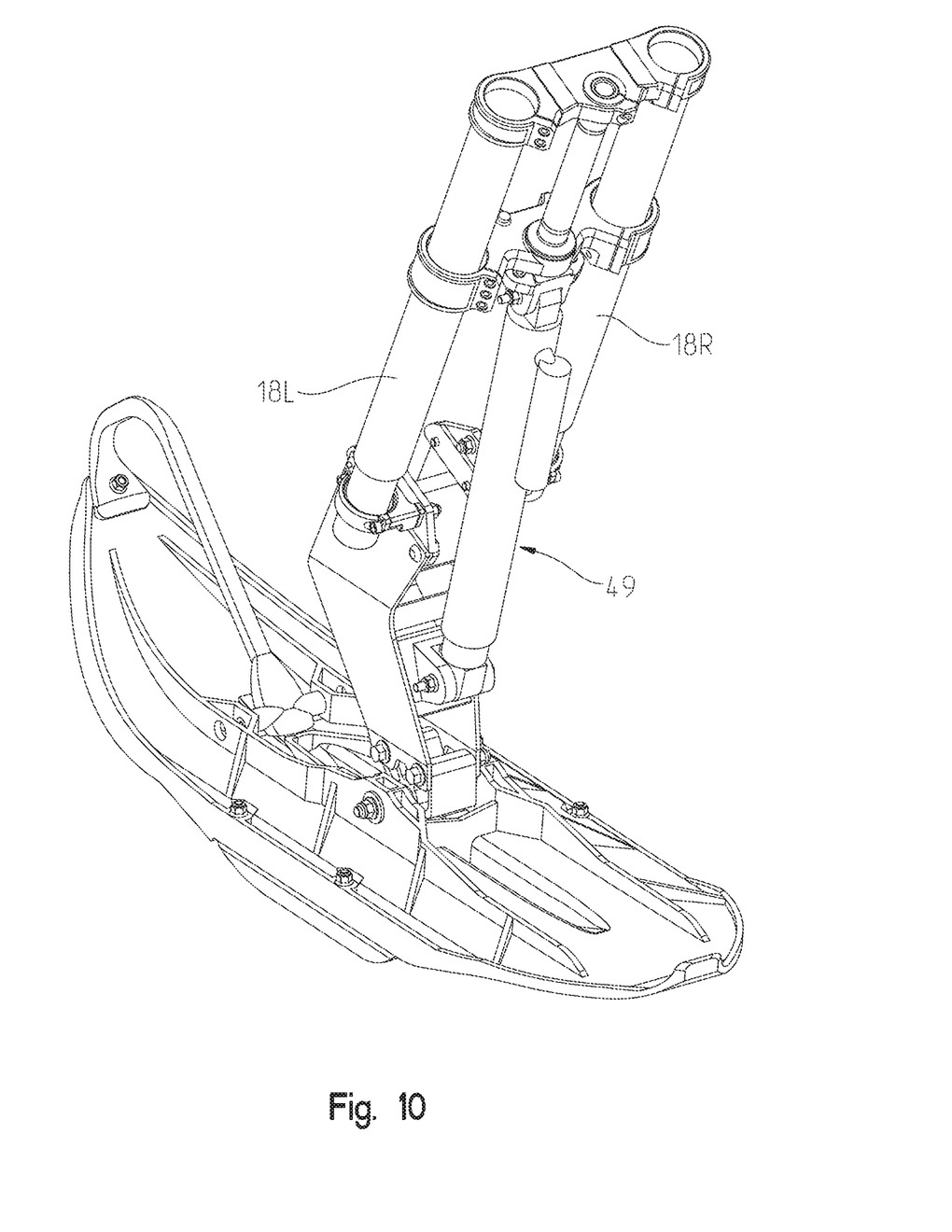
FIG. 10 is a view similar to that of FIG. 3 shown in a fully compressed condition.
Figure 11:
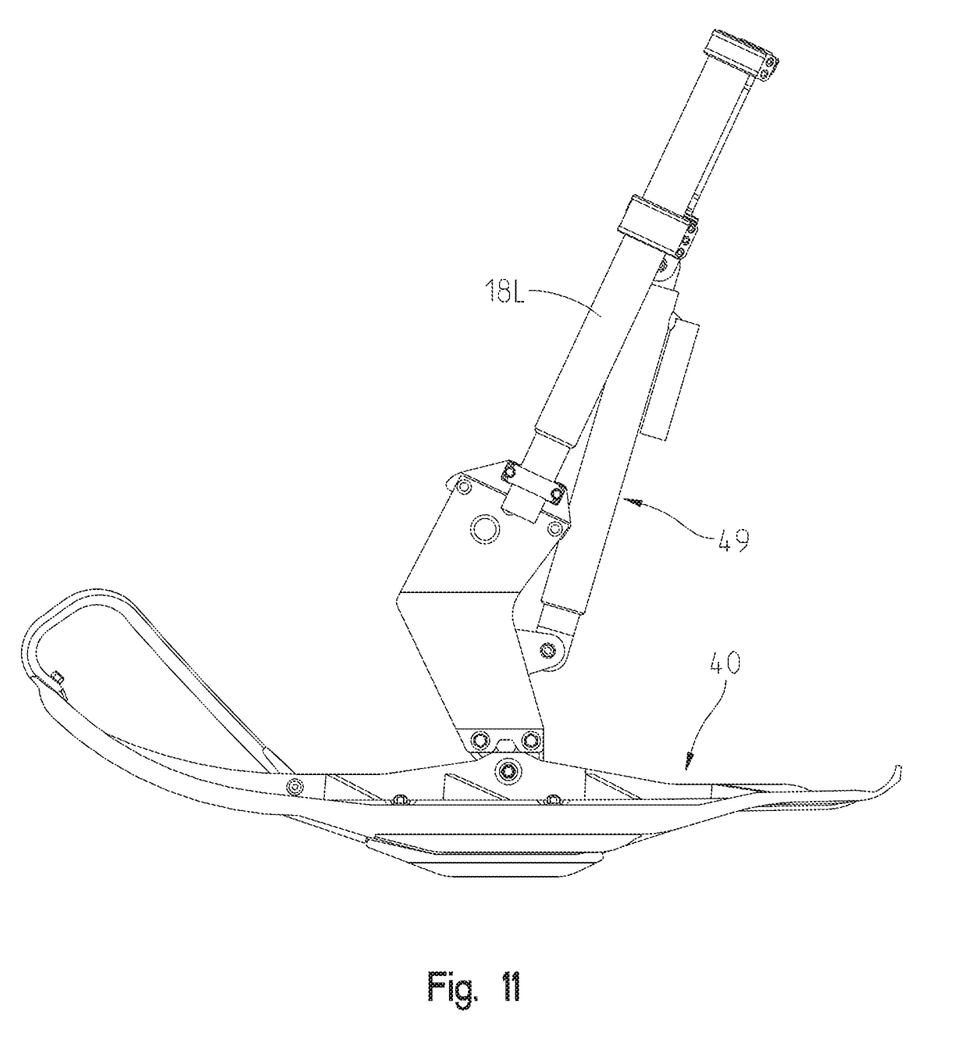
FIG. 11 is a view similar to that of FIG. 4 shown in suspension in a fully compressed condition.

With reference now to FIGS. 9-11, the operation of the front suspension 15 will now be described in greater detail. As shown, suspension 15 is shown in the fully collapsed state where both the shock absorbers of the front forks 18L, 18R and linear force element 49 are shown in a fully compressed state. As shown, linear force element 49 is an air shock available from Fox Shox and has the same linear travel as the motor bike forks 18L, 18R; a range of 8 to 14", preferably 10 to 12". In the embodiment shown the linear travel is 11". In the embodiment shown, linear force element 49 is an EVOL Series Float shock available from Fox Shox located at 915 Disc Dr., Scotts Valley, Calif. 95066. This shock is an air shock with a progressive rate which progressive range is adjustable.

While the LFE 49 is shown herein as an air shock, other linear force elements are possible. For example, the linear force element could be a gas shock or a shock with a spring over, similar to that described in our U.S. Pat. No. 8,079,602. The linear force element could also be a hydraulic shock, or a spring or a series of springs. These components could have a linear or progressive rate which rate is adjustable. In addition, linear force element could be a linkage coupled between the triple clamp and the ski, a linkage similar to that described in our US Patent as the coupled suspension system. In that way, the stroke of the shock could be tuned to vary from the stroke of the front forks 18L and 18R.

Linear force element 49 works in combination with the motor bike shocks within forks 18L, 18R to give the front forks the proper spring rate and damping force for the snow bike. In the embodiment shown, linear force element 49 is also in compression the entire time; that is between the positions shown in 2-4 and 9-11.

It should be appreciated that the spindle 50 could be comprised of an integrated unit where the all of the components are fixed to each other, namely spindle 50, brackets 76, the inner portions of brackets 86 and coupler 100. This could be assembled by such means as welding or adhesives for example. The integrated spindle could also be a forging or casting which is in a homogenous state.

Figure 12:
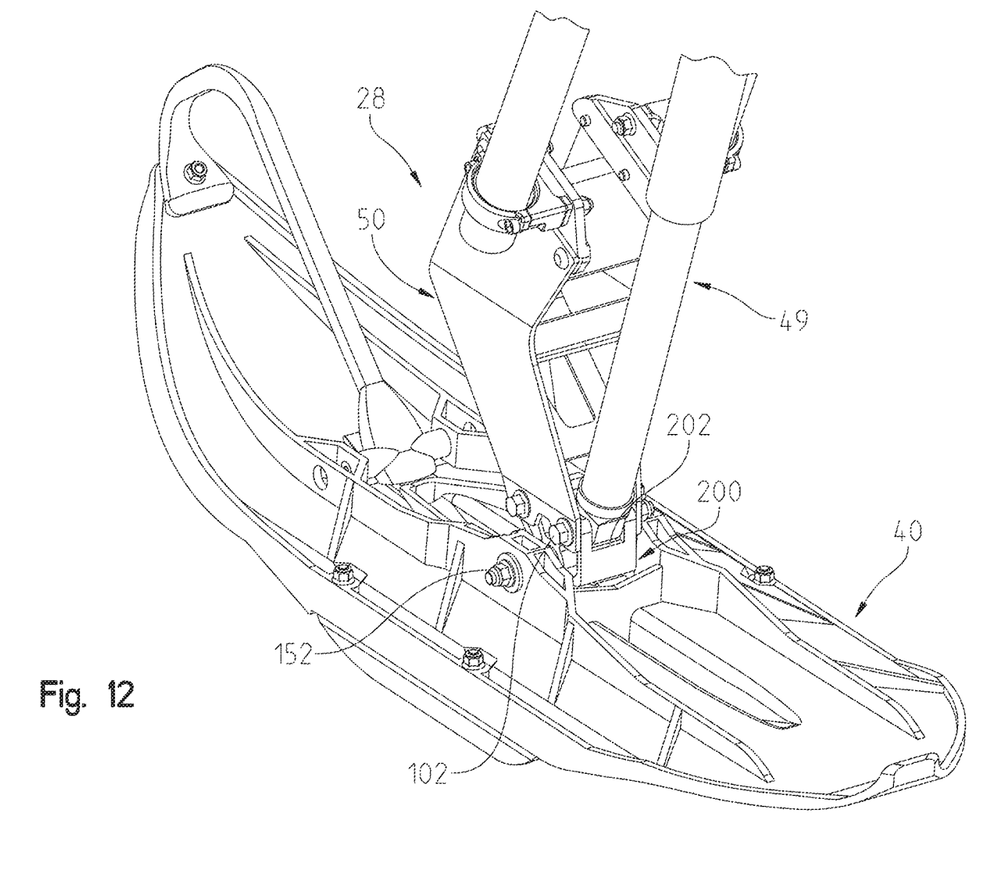
FIG. 12 is a view similar to that of FIG. 3 showing an alternate lower shock mounting.

It should also be appreciated that a lower end of the LFE 49 could be attached to a modified coupler 100. As shown in FIG. 12, a coupler 200 is shown at 200, which is identical to coupler 100, yet it includes a notch at 202 to receive a lower end of LFE 49. In this manner, fastener 102 couples both the coupler 200 and the LFE 49, as fastener 102 extends through aperture 178 (FIG. 5) of LFE 49.

In the above described embodiment, the ski mounts 28 and linear force element 49 are designed as a kit for converting a motorbike to a snow bike having existing shocks positioned in the front forks, or for retrofitting existing snow bikes. In the case where a new snow bike front suspension is desired, the front suspension could include front forks 18L and 18R, but in this case, the front forks would not include internal shocks, but rather would only be struts which allow linear telescopic movement but would not have any internal dampening resistance. While this design would include a linear force element 49, the spring rate of the combined suspension 15 would still be consistent with that disclosed above.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:
1. A linear force absorption assembly for a snow vehicle having a frame, a front fork with a triple clamp, and at least one ski, comprising;
   a linear force element having an upper end and a lower end;
   an upper coupler configured to couple the upper end of the linear force element to the triple clamp;
   and a ski mount configured to operably couple the lower end of the linear force element to a mount of the at least one ski, the ski mount including a first aperture for mounting the ski mount to the mount of the at least one ski, and a second aperture coupling the ski mount to the linear force element.

2. The absorption assembly of claim 1, wherein the ski mount is a homogeneous member.

3. The absorption assembly of claim 2, wherein the ski mount is a forging.

4. The absorption assembly of claim 1, wherein, the ski mount has a notch for receiving the lower end of the linear force element.

5. The absorption assembly of claim 4, wherein the lower end of the linear force element has flattened surfaces receivable within the notch.

6. The absorption assembly of claim 5, wherein the linear force element has aperture through the flattened surfaces.

7. The absorption assembly of claim 6, further comprising a fastener receivable through the second aperture and through the linear force element aperture.

8. The absorption assembly of claim 1, wherein the upper coupler has a base portion for mounting to the triple clamp.

9. The absorption assembly of claim 8, wherein the upper coupler has a clevis for coupling to the upper end of the linear force element.

10. The absorption assembly of claim 1, wherein the linear force element is located substantially behind the front fork.

11. The absorption assembly of claim 10, wherein the linear force element is longer than at least one leg of the front fork.

12. The absorption assembly of claim 1, wherein the triple clamp is adjacent to a steering assembly of the snow vehicle.

13. A method of providing a linear force absorption assembly for a snow vehicle having a frame, a front fork with a triple clamp, and at least one ski, comprising;
providing a linear force element having an upper end and a lower end;
providing an upper coupler configured to couple the upper end of the linear force element to the triple clamp;
and providing a ski mount for operably coupling the lower end of the linear force element to a mount of the at least one ski, the ski mount including a first aperture for mounting the ski mount to the mount of the at least one ski, and a second aperture coupling the ski mount to the linear force element.

14. The method of claim 13, wherein the ski mount is formed in a homogenous member.

15. The method of claim 14, wherein the ski mount is formed by forging.

16. The method of claim 13, further comprising the step of providing the ski mount with a notch for receiving the lower end of the linear force element.

17. The method of claim 16, further comprising the step of flattening surfaces on the lower end of the linear force element wherein the flattened surfaces are receivable within the notch.

18. The method of claim 17, further comprising the step of providing the linear force element with an aperture through the flattened surfaces.

19. The method of claim 18, further comprising providing a fastener receivable through the second aperture and through the linear force element aperture.

20. The method of claim 13, wherein the upper coupler is provided with a base portion for mounting to the tripe clamp.

21. The method of claim 20, wherein the upper coupler is provided with a clevis for coupling to the upper end of the linear force element.

22. The method of claim 13, wherein the linear force element is located substantially behind the front fork.

23. The method of claim 22, wherein the linear force element is longer than at least one leg of the front fork.

24. The method of claim 13, wherein the triple clamp is adjacent to a steering assembly of the snow vehicle.

* * * * *